(12) United States Patent
Salinger

(10) Patent No.: US 6,304,594 B1
(45) Date of Patent: Oct. 16, 2001

(54) INTERFERENCE DETECTION AND AVOIDANCE TECHNIQUE

(75) Inventor: Sheldon Norman Salinger, Los Altos, CA (US)

(73) Assignee: General Dynamics Government Systems Corporation, Needham, MA (US)

(*) Notice: Subject to any disclaimer, the term of this patent is extended or adjusted under 35 U.S.C. 154(b) by 0 days.

(21) Appl. No.: 09/123,203

(22) Filed: Jul. 27, 1998

(51) Int. Cl.[7] ................................................. H04B 1/38

(52) U.S. Cl. ........................................................... 375/222

(58) Field of Search ..................................... 375/219, 220, 375/222, 259, 284, 285; 370/278, 282, 286, 206; 455/65, 63, 296, 514, 501, 570, 557

(56) References Cited

U.S. PATENT DOCUMENTS

| | | | |
|---|---|---|---|
| 3,940,694 | 2/1976 | Price et al. | 325/42 |
| 4,291,277 | 9/1981 | Davis et al. | 330/149 |
| 4,462,001 | 7/1984 | Girard | 330/149 |
| 4,555,790 | 11/1985 | Betts et al. | 375/39 |
| 4,587,498 | 5/1986 | Bonnerot et al. | 329/122 |
| 4,615,038 | 9/1986 | Lim et al. | 375/14 |
| 4,731,816 | 3/1988 | Hughes-Hartogs | 379/98 |
| 4,805,191 | 2/1989 | Burch et al. | 375/11 |
| 4,827,431 | 5/1989 | Goldshtein | 364/514 |
| 4,890,300 | 12/1989 | Andrews | 375/60 |
| 4,980,897 | 12/1990 | Decker et al. | 375/38 |
| 4,995,057 | 2/1991 | Chung | 375/13 |
| 5,105,445 | 4/1992 | Karam et al. | 375/60 |
| 5,107,520 | 4/1992 | Karam et al. | 375/60 |
| 5,113,414 | 5/1992 | Karam et al. | 375/60 |
| 5,148,448 | 9/1992 | Karam et al. | 375/60 |

(List continued on next page.)

OTHER PUBLICATIONS

Suzuki, T. Takatori, H., Ogawa, M. and Tomooka, K., "Line Equalizer for a Digital Subscriber Loop Employing Switched Capacitor Technology," IEEE Trans on Communications, vol. COM–30, No. 9, pp. 2074–2082, Sep. 1982.

Agazzi, O., Tzeng, C.–P.J., Messerchmitt, D.G., and Hodges, D.A., "Timing Recovery in Digital Subscriber Loops," IEEE Trans. on Communications, vol. COM–33, No. 6, pp. 558–569, Jun. 1985.

Gardner, F.M., "A BPSK/ZPSK Timing—Error Detector for Sampled Receivers," IEEE Trans. on Communications, vol. COM–34, No. 5, pp. 423–429, May 1986.

Meyers, M.H., "Robust Control of Decision Directed Loops," IEEE CH2655–9/89/0000–1030, pp. 1030–1036, Sep. 1989.

(List continued on next page.)

Primary Examiner—Chi Pham
Assistant Examiner—Emmanuel Bayard
(74) Attorney, Agent, or Firm—Jenner & Block, LLC

(57) ABSTRACT

The presence of interfering continuous-wave signals are automatically detected in the demodulated output of a quadrature amplitude modulation data communications receiver. The transmitter is re-tuned in order to avoid the detected interferer. Statistical information concerning the received signal is accumulated at a receiver and is analyzed to determine whether a reduction in the received bit-error-rate is due to the presence of an interferer. If an inteferer is determined to be present within the signal transmission bandwidth, then the potentially available transmission band is spectrum analyzed to find a new portion of that band in which the signal can be transmitted free of the interferer. The results of the statistical analysis and the spectral analysis are conveyed back to the transmitter which then readjusts the transmission parameters and forwards the new parameters to the receiver. The system resumes operation in the new transmission band with no interference and with the bit-error-rate restored to its required level.

26 Claims, 9 Drawing Sheets

U.S. PATENT DOCUMENTS

| | | | | |
|---|---|---|---|---|
| 5,166,924 | * | 11/1992 | Moose | 370/32.1 |
| 5,249,200 | | 9/1993 | Chen et al. | 375/58 |
| 5,285,474 | | 2/1994 | Chow et al. | 375/13 |
| 5,295,138 | | 3/1994 | Greenberg et al. | 370/57 |
| 5,313,467 | | 5/1994 | Varghese et al. | 370/94.1 |
| 5,339,054 | | 8/1994 | Taguchi | 332/100 |
| 5,394,392 | | 2/1995 | Scott | 370/24 |
| 5,479,447 | | 12/1995 | Chow et al. | 375/260 |
| 5,491,726 | * | 2/1996 | Cheng et al. | 375/343 |
| 5,497,505 | | 3/1996 | Koohgoli et al. | 455/34.1 |
| 5,519,356 | | 5/1996 | Greenberg | 329/340 |
| 5,519,731 | * | 5/1996 | Cioffi | 375/260 |
| 5,541,955 | * | 7/1996 | Jacobsmeyer | 375/222 |
| 5,548,809 | | 8/1996 | Lemson | 455/34.1 |
| 5,551,057 | * | 8/1996 | Mitra | 455/522 |
| 5,572,553 | | 11/1996 | Kimiavi et al. | 375/344 |
| 5,606,577 | | 2/1997 | Grube et al. | 375/295 |
| 5,621,767 | | 4/1997 | Brandt et al. | 375/344 |
| 5,673,290 | | 9/1997 | Cioffi | 375/260 |
| 5,694,440 | | 12/1997 | Kallman et al. | 375/355 |
| 5,705,958 | | 1/1998 | Janer | 332/103 |
| 5,710,766 | | 1/1998 | Schwendeman | 370/329 |
| 5,726,978 | | 3/1998 | Frodigh et al. | 370/252 |
| 5,732,333 | | 3/1998 | Cox et al. | 455/126 |
| 5,742,639 | * | 4/1998 | Fasulo, II et al. | 375/219 |
| 5,751,741 | * | 5/1998 | Voith et al. | 371/37.7 |
| 5,751,766 | | 5/1998 | Kletsky et al. | 375/224 |
| 5,765,113 | * | 9/1998 | Russo et al. | 455/557 |
| 5,781,582 | * | 7/1998 | Sage et al. | 375/202 |
| 5,812,594 | * | 9/1998 | Rakib | 375/219 |
| 5,911,120 | * | 6/1999 | Jarett et al. | 455/417 |
| 6,055,268 | * | 4/2000 | Timm et al. | 375/229 |
| 6,075,797 | * | 6/2000 | Thomas | 370/468 |

OTHER PUBLICATIONS

Sari, Hikmet, and Said, Moridi, "New Phase and Frequency Detectors for Carrier Recovery in PSK and QAM Systems", IEEE Trans. on Communications, vol. 36, No. 9, pp. 1035–1043, Sep. 1988.

Sari, H., Desperben, L., and Moridi, S., "A New Class of Frequency Detectors for Carrier Recovery in QAM Systems", IEEE CH2314–3/86/0000–0482, pp. 482–486, 1986.

Brown, R., Sorbaba, M., Wang, T., Segev, R., Van Kerkhove, J.F., Mildonian, H., Hall, C., Zimmerman, G., Martinez, K., Pires, T.K., Mullaney, K., Zain, I., Young B., Gleichauf, P., Hohhof, K., "Draft Interface Specification for a CAP Based RADSL System", Jul. 1996.

Karam, G., and Sari, H., "A Data Predistortion Technique with Memory for QAM Radio Systems", IEEE Trans on Communications, vol. 39, No. 2, pp. 336–344, Feb. 1991.

* cited by examiner

INTERFERENCE DETECTION AND AVOIDANCE TECHNIQUE

RELATED PATENT APPLICATION

The present method and Apparatus for Variably Allocating Upstream and Downstream Communication Spectra, by Neil E. Furakawa and Sheldon N. Salinger, filed Dec. $24^{th}$, 1997, Ser. No. 08/998,237.

FIELD OF THE INVENTION

The present invention relates generally to data communications, and more particularly, to a method and apparatus for automatically detecting the presence of an interfering signal in a data communications receiver and retuning a transmitter to avoid the detected interfering signal.

BACKGROUND OF THE INVENTION

To meet the growing need for ever increasing digital data bandwidth for new subscriber services (e.g., high-data-rate internet service, video telephony, and high definition television) telephone companies are looking towards the use of very-high-speed digital subscriber lines (VDSL). VDSL provides a means to carry such data into the home or business over the existing copper wires used by plain old telephone service (POTS). VDSL carries digital data at bit rates reaching 52 Mbps using carrierless AM/PM (CAP) modulation, which is related to quadrature amplitude modulation (QAM). Modulation contellations can reach 256 symbol points with symbol rates up to 6480 Kbaud. The CAP modulation constellations look the same as the corresponding baseband QAM constellations. The signals are carried within the spectral band up to 30 MHz, which is above the frequency band used by POTS on the same wire pair. Due to the high loss of the copper telephone wires at these frequencies, the VDSL signals are carried on the telephone wires only over the "last mile" (i.e., the last segment of copper wire between a central office and the user's premises).

Within the spectral band of 0.5 MHz to 30 MHz, the VDSL transmissions over the telephone wires are subject to radio frequency interference (RFI) from AM radio broadcasts and amateur radio transmissions, which can be picked up by the telephone wires acting as receiving antenna. This interference can corrupt the received and demodulated CAP/QAM signals, causing symbol and bit errors in the received data. The AM broadcast signals remain indefinitely at the same frequencies in any neighborhood within range of the local AM radio transmitters. The amateur radio signals, however, will vary in frequency throughout the day as the operator tunes his transmitter to optimize the HF-band skywave propagation conditions over the communication links he is attempting to maintain. There are several narrow spectral bands allocated to amateur radio within the 0.5 MHz to 30 MHz band carried by VDSL transmission lines. A VDSL transmission line will normally be interfered with only by amateur radio transmitters within a few hundred feet of the transmission line.

Narrowband interferers, such as AM radio broadcasts and amateur radio signals, are not the only interferers that corrupt the CAP/QAM signals. Wideband noise that extends across a large portion of the VDSL spectrum may also interfere, causing undesirable changes in the carrier-to-noise ratio (CNR) and the bit error rate (BER). Wideband noise can be caused, for example, by electrical machinery, internal combustion engines (e.g., lawn mowers) or fluorescent lights operating in the immediate vicinity of a cable drop to the premises. Narrowband interferers tend to be more predictable and hence somewhat easier to avoid, for example, by detecting the frequency of the interferer and subsequent adjustment of the CAP/QAM VDSL signal for avoidance thereof. Wideband interferers, on the other hand, are somewhat more random, and cannot generally be accounted for prior to data transmission and are therefore more difficult to avoid. Especially difficult is detection and characterization of the interferers without interruption of the data signal for analysis.

Thus, what is needed is a method and apparatus for recognizing the difference between narrowband interferers and wideband noise sources without relying upon spectrum analysis of the received signal except to locate a new transmission band. This is accomplished by the present invention whereby a determination is made of the presence or absence of a narrowband or continuous wave (CW) interferer, and in many cases inferring its carrier frequency without the need for interrupting the transmitted data stream. The transmitted data stream is only interrupted when an inteferer is detected and a spectrum analysis is needed to find a new transmission band. The interferer presence determination can generally be accomplished when the interferer level is low enough that the presence of the interferer cannot be inferred by visual examination of the constellation plot of the demodulated signal. When a narrowband signal is present, the shape of the symbol clusters in the constellation plot changes from a centrally peaked distribution, characteristic of a signal in Gaussian noise, to a ring as shown in FIGS. 1A and 1B. The present invention recognizes this transition automatically and at low interference levels where the transistion to a ring is not yet visually apparent. Adjustment of the transmitted symbol rate, bandwidth and carrier frequency is provided in order to avoid the troublesome interferer and other interferers that may be present in the signal environment.

SUMMARY OF THE INVENTION

An object of the present invention is to provide an improved modem that detects and avoids interference signals.

Another object of the present invention is to provide an improved method for recognizing the presence of a continuous wave (CW) interferer in a digital data transceiver.

Still another object of the present invention is to provide a digital data receiver for recognizing narrowband and wideband interferers with either none or little data interruption by using statistical analysis and adjusting the transmitter accordingly to avoid such inteferers.

According to a first embodiment of the present invention, a method of non-intrusively detecting whether an interference signal is present with a received signal of interest is provided. The interference signal is detected by accumulating statistical information associated with the signal of interest. The statistical information is analyzed to determine whether an interference signal is present and is intrusive. If an intrusive interference signal is present, it is analyzed to determine its frequency. An alternate spectral region is next identified that is free of interferers. Lastly, communications are adjusted by retuning or modifying data rates to allow continued communications without intrusive interference.

In another embodiment of the present invention, a modem capable of non-intrusively detecting an unwanted interferer while a receiving of a data signal is provided. The modem includes a transmitter for transmitting information to a second modem and a receiver for receiving the data signal from the second modem. A memory is connected to the receiver for storing statistical information associated with said data signal, including data sample values in each received symbol cluster in the data signal's amplitude phase constellation. A processor measures constellation statistics from the statistical information, determining a carrier-to-noise ratio and bit error rate of said data signal, determining whether the bit error rate exceeds an acceptable limit by testing whether symbol cluster changes from a Rayleigh distribution to a Ricean distribution, and when the bit error rate exceeds said acceptable limit, interupting the received data signal to spectrum analyze a transmission band to find an interference free region of the transmission band and communicating the interference free region to the second modem for adjustment of transmission parameters.

The foregoing and other objects, features, and advantages of the invention will be apparent from the following more particular description of a preferred embodiment of the invention, as illustrated in the accompanying drawing.

DETAILED DESCRIPTION

Figure 1A:
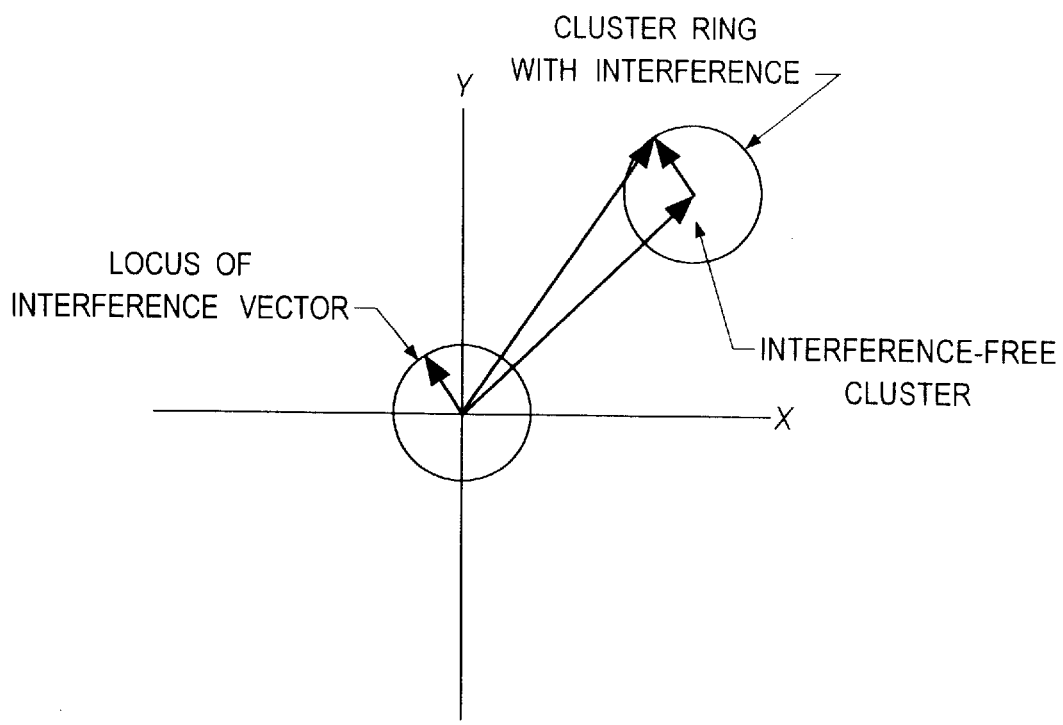
FIGS. 1A and 1B are an illustration of the effect of a sinusoidal tone interferer upon the symbol clusters in a quadrature amplitude modulation (QAM) constellation.

The present invention provides an improved method for recognizing the presence of a CW interferer in the demodulated output of a CAP or QAM digital data receiver. The method relies on the fact that the vector combination of the interferer with a CAP/QAM symbol cluster changes the radial distribution of sample locations in the cluster from a Rayleigh distribution in the presence of only Gaussian noise to a Ricean distribution in the presence of such an interferer. The invention uses statistical analysis of the positions of a set of samples in the demodulated symbol constellation to decide whether the distribution is sufficiently shifted towards Ricean to declare that an interferer is present.

Three different measures of the shape of a probability distribution function were tested: the ratio of the mean to standard deviation, the skewness or third central moment, and the kurtosis or fourth central moment. Of these measures, the skewness was found to be best correlated with the received carrier-to-interference ratio (CIR), and the kurtosis was also found to provide a useful degree of correlation. By calculating either the average skewness or average kurtosis over all clusters in the constellation, and testing this average skewness or average kurtosis against a threshold, the present invention determines that an interferer is present if the average skewness or average kurtosis is below the threshold, and that no interferer is present if the average skewness or average kurtosis is above the threshold.

While a fixed threshold is possible, it has been found that at high CNRs the interference levels (measured as a fraction of the noise margin) that can be positively recognized in this way are higher than the interference levels that can be recognized at low CNRs. In high noise (low CNR) situations there is not much difference in the skewness or kurtosis of an interference-free signal and one that has a moderate level interferer that could otherwise be detected in a high CNR environment. With a small set of sample data, the statistical fluctuations in the computed skewness or kurtosis can be larger than the significant differences in skewness. However, with a large enough sample set, even small differences in skewness or kurtosis and consequent CIR can be detected, even at low CNR, providing that the threshold criterion is made a function of the CNR (which is routinely measured). Generally, skewness has been found to be more stable with respect to sampling fluctuations than is kurtosis. The main limitations will be the speed with which the data samples can be transferred to the data processing computer and the processing speed of the computer. For a cost-limited unit with limited computing resources, such as a VDSL subscriber modem, there may be design limitations on the number of data samples or the sampling rate that can be handled.

According to the present invention, the receiver accumulates certain statistics regarding the data sample values in each received symbol cluster in the signal's amplitude-phase constellation. These statistics are used to calculate the CNR (actually, the carrier to noise-plus-interference ratio) and the BER for the received signal constellation. If the BER falls below an acceptable limit, then the average cluster skewness and/or kurtosis is also computed for the constellation. A table lookup provides the threshold skewness and kurtosis values at the calculated CNR below which a calculated skewness or kurtosis would indicate the presence of an interferer of amplitude sufficient to significantly affect the measured CNR. The calculated skewness and/or kurtosis are then compared to the selected threshold skewness and/or kurtosis, and if the calculated skewness and/or kurtosis are below the threshold, then the presence of an interferer is declared.

The frequency of the interferer is then determined by spectral analysis of the received transmission band for the signal of interest using, most commonly, an FFT. If the interferer is strong (small CIR), the spectral line of the interferer may show up above the spectrum of the SOI. However, if the amplitude of the interferer is approximately the same as that of the SOI, it will generally be necessary to interrupt transmission of the SOI long enough to collect interference data to spectrum analyze. In some cases, it is possible to infer the frequency of the interferer if there can only be one such frequency. For example, in VDSL transmission there may be only one allocated amateur radio band within the spectral band used for a particular VDSL transmission in which interference is detected. This will then be the interferer frequency. It may then be possible and acceptable to avoid the interferer by reducing the transmission bandwidth (and the corresponding data rate) to the segment of the original transmission band on one side of the interferer, so that the interferer is then outside the new VDSL transmission passband.

If reducing the data rate is not an acceptable alternative, then it will be necessary to find another passband within the available VDSL spectral range that is free of interferers. This requires spectrum analyzing the entire VDSL spectral range, not just that passband in current use. This must be done before any bandpass filtering in the receiver, and will again require interrupting the VDSL data transmission long enough to collect data for spectral analysis of the interference environment. The advantage of the present invention is that this interruption of the SOI data transmission need only be done when it has been determined from constellation analysis that there is an interferer present which is causing unacceptable degradation of the BER. If the BER is so degraded, then it does not matter that data transmission is interrupted, since the received data already has too many errors. It is better to interrupt transmission and find an acceptable transmission band so that suitably error-free transmission can be restored as quickly as possible.

The present invention detects when an interferer is present that is degrading the BER of the SOI. The invention then provides means for determining a transmission band that will be free of degrading interferers and then retuning the transmitter to the new transmission band.

Figure 2:
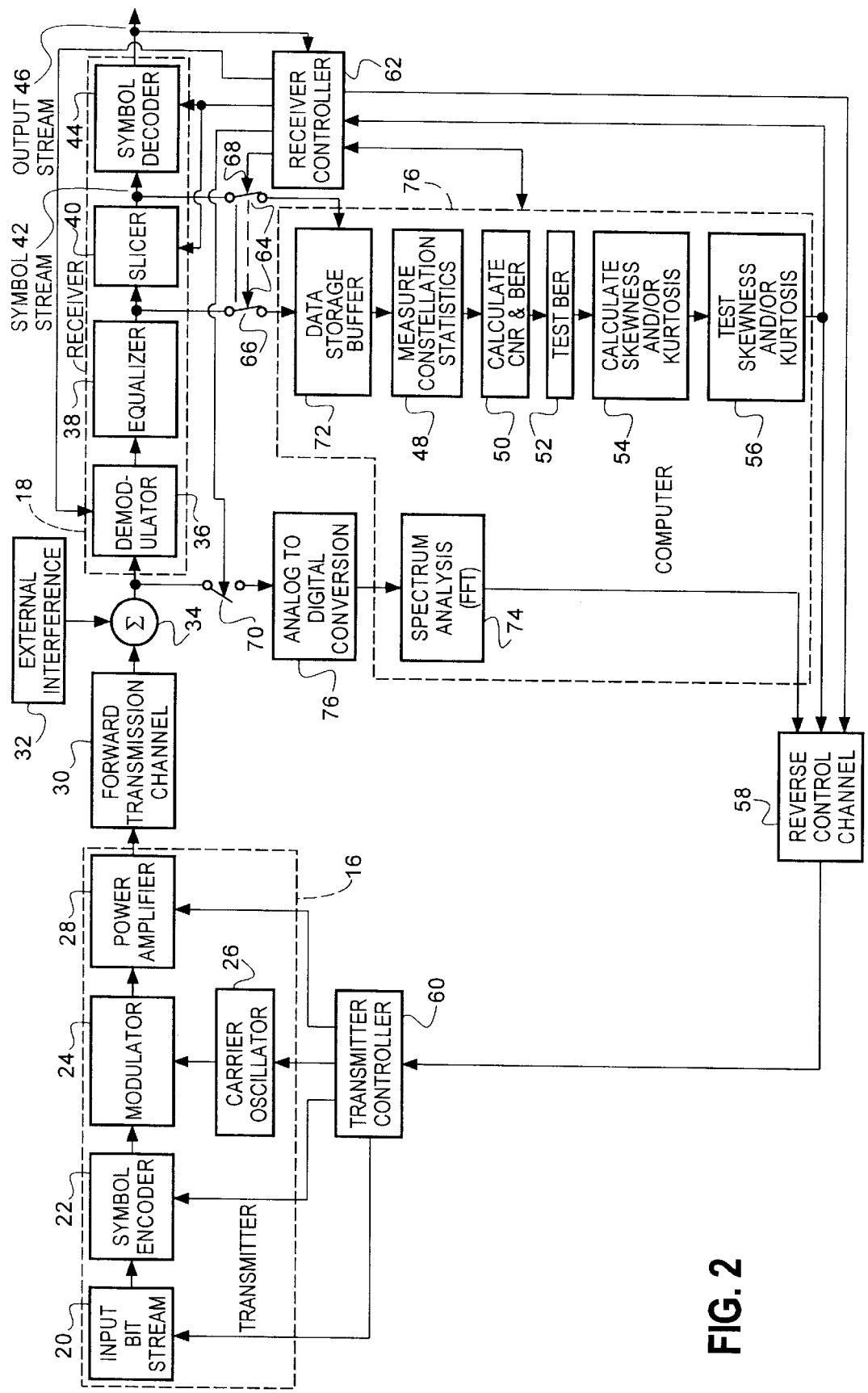
FIG. 2 is a block diagram of a communication system using the present invention.

Referring now to the figures, and for the present to FIG. 2, therein is shown a block diagram of the present invention. In the transmitter 16, the input bit stream 20 enters the symbol encoder 22 where the input bit stream 20 is encoded into QAM/CAP modulation. The resulting symbol sequence has m bits per symbol in a constellation of M symbols. Generally, $m=\log_2 M$. In the modulator 24, the symbol sequence out of the symbol encoder 22 is modulated onto in-phase and quadrature rails at a carrier frequency derived from carrier oscillator 26. The modulated signal is then boosted in power by the power amplifier 28 and the signal of interest (SOI) is transmitted over the forward transmission channel 30 to the receiver 18. Along the forward transmission channel 30, external radio-frequency interference 32 is added to the transmitted SOI, the addition being modeled by the summation 34.

The combined signal of SOI plus RFI enters the receiver 18 where it is first demodulated in the demodulator 36. This includes locking to the carrier frequency and symbol clock rate, separating the in-phase and quadrature components, downconverting from the carrier frequency to baseband, and sampling the signal at the symbol clock rate. The output of the demodulator 36 is a sequence of in-phase and quadrature component values for the sum of SOI plus noise plus interference at each symbol sample. The output of the demodulator 36 is passed through the equalizer 38, which compensates for and removes the effects of intersymbol interference and changes in sample values caused by channel distortion, filtering, and multipath propagation (e.g., extraneous paths involving bridged taps, i.e., open circuited twisted pairs connected in shunt with the main-path twisted pair on a VDSL line). The equalized signal goes to slicer 40 which tests the in-phase and quadrature values against decision boundaries and makes a decision as to the symbol state for each equalized sample. The symbol stream 42 out of the slicer then goes to the symbol decoder 44. The symbol decoder 44 converts each symbol to the binary bit sequence corresponding to the input symbol state and outputs a binary bit stream 46 representing the information conveyed by the system. The bit stream 46 goes to an interpreter (not shown) which separates the payload information from the overhead control bits.

The signal at the output of the equalizer 38 is sampled by the left hand pole 66 of double-pole switch 64, and the signal at the output of the slicer 40 is sampled by the right hand pole 68 of double-pole switch 64. Both poles of the switch 64 are sampled in synchronism under control of receiver controller 62. Both sets of sample data are stored in data storage buffer 72 within computer 76, with the output samples of equalizer 38 being delayed so that they are aligned with the corresponding output samples of the slicer 40 for the same symbols in parallel columns of the buffer 72. These sample times are determined by control bits in the output bit stream 46 and by constraints imposed by the data collection capabilities and processing rates of the signal processing path within computer 76. For example, the switch 64 might be commanded to sample only every n-th symbol out of the equalizer 38 and its corresponding sliced value out of slicer 40. In addition, as will be described subsequently, switch 64 will normally be commanded to collect blocks of sample data only at specific times as will be described.

The data storage buffer 72 consists of two blocks of random access memory (RAM) within computer 76. The two blocks of RAM are "pingponged", that is, while data is being loaded into one block, the data in the other block is being processed. When the data in the one block has been processed, the contents of that block are overwritten with new data and the data in the other block are then processed. As is known by those skilled in the art, other types of storage can be used in place of the RAM, including, for example, EPROM, SDRAM, hard disk, etc.

At system startup, data are initially transferred over the forward transmission channel 30 using a relatively low order constellation, say 16-QAM, with a relatively low symbol rate and with a bandwidth and carrier frequency selected to have a high probability of being free of RFI. At startup, the receiver 18 is automatically set by the receiver controller 62 to tune to the standard startup carrier frequency, symbol rate, and constellation size. Thereafter, prior to any time that the transmitter 16 plans to change either the carrier frequency, symbol rate or constellation size, the transmitter 16 sends a transmission change notification to the receiver 18. The receiver controller 62 extracts the new transmission parameters from the output bit stream 46 and sends an acknowledgment over reverse control channel 58 to the transmitter controller 60. Only when the transmitter controller 60 has received this acknowledgment does it command the transmitter 16 to change the transmission parameters. At this point the receiver controller 62 has commanded the receiver 18 and the computer 76 to expect the new transmission parameters. Knowledge of the new carrier frequency and symbol rate permits the demodulator 36 to rapidly acquire lock to these new parameters, while the slicer 40 decision boundaries are reset to correspond to the new constellation.

Once initial receiver synchronization has been received and acknowledged to the transmitter controller 60 over the reverse control channel 58, the transmitter controller 60 informs the receiver controller 62 over the forward transmission channel 30 and then turns off power amplifier 28 to interrupt the transmitted signal. The receiver carrier frequency and symbol rate phase locked loops in demodulator 36 continue to flywheel at the previously acquired carrier frequency and symbol rate during this interruption. Also during the interruption, switch 70 is closed and switch 64 is opened, so that the radio frequency interference environment is sampled and digitized by analog-to-digital converter 78. Computer 76 then collects digitized time samples of the interference environment which it spectrum analyzes using an FFT 74. The resulting interference environment spectrum is transmitted over reverse control channel 58 to transmitter controller 60, which selects a new carrier frequency, symbol rate and constellation size that are adequate to carry the desired payload data rate while avoiding any RFI that may be present in the environment. After notifying the receiver controller 62 of the new parameters and receiving an acknowledgment, the transmitter controller 60 resets the parameters in the symbol encoder 22 and carrier oscillator 26, and turns back on the power amplifier 28 to begin data transmission.

Figure 3:
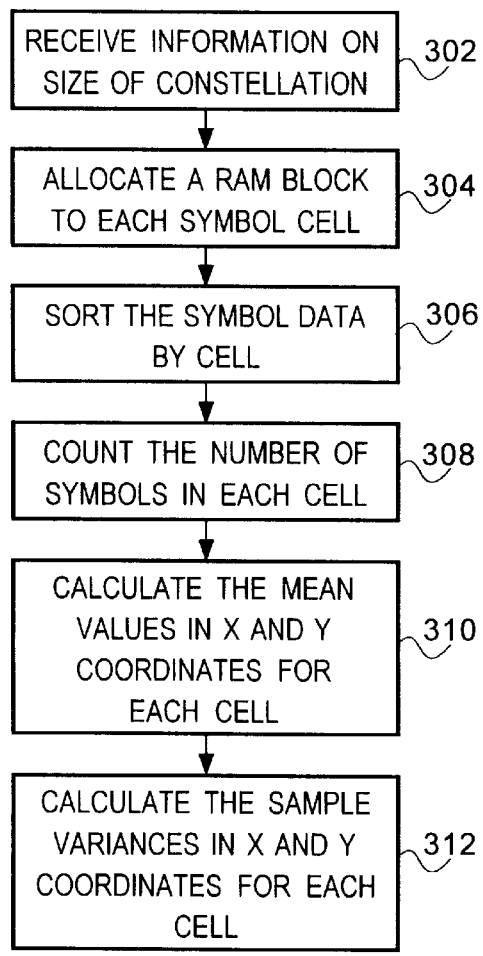
FIG. 3 is a flow chart of the processing step of measuring the constellation statistics.

The first processing step on any block of input data out of data storage buffer 72 is to measure the constellation statistics 48. The flow chart for this processing step is shown in FIG. 3. The computer 76 receives information in step 302 from the receiver controller 62 as to the size of the symbol constellation. A block of data storage is then allocated to each symbol cell at step 304, and the symbol data out of the equalizer 38 are sorted into the appropriate symbol cell locations at step 306 according to the corresponding cell identifiers that come from the output of the slicer 40. After the presliced symbol data is sorted into bins by cell, the number of symbols in each cell are counted (step 308), and the sample mean values and sample variances of the data in the in-phase (x) and quadrature (y) directions are calculated for each bin at steps 310 and 312. This may be done for each symbol cell in the constellation or, for large constellations such as 256-QAM, for just the cells in one quadrant. With M cells and Nm sample symbols in each cell, the sample means and sample variances are given by:

(1) Sample mean x-position of sample set in cell m:

$$\bar{x}_m = \frac{1}{N_m} \sum_{n=1}^{N_m} x_{mn},$$

(2) Sample mean y-position of sample set in cell m:

$$\bar{y}_m = \frac{1}{N_m} \sum_{n=1}^{N_m} y_{mn},$$

(3) Sample variance on x-positions of sample set in cell m:

$$s_{x,m}^2 = \frac{1}{N_m - 1} \left[ \sum_{n=1}^{N_m} x_{mn}^2 - \bar{x}_m \right],$$

(4) Sample variance on y-positions of sample set in cell m:

$$s_{y,m}^2 = \frac{1}{N_m - 1} \left[ \sum_{n=1}^{N_m} y_{mn}^2 - \bar{y}_m \right].$$

The numbers of samples $N_m$ in each cell are counted at step 308, since these numbers are needed in the above calculations.

Figure 4:
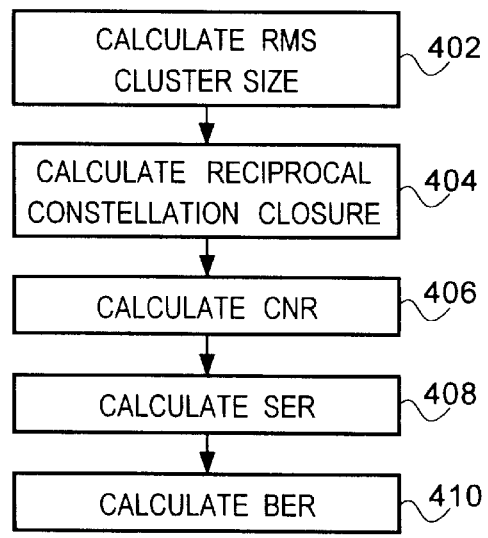
FIG. 4 is a flow chart of the processing step of determining the carrier-to-noise ratio (CNR) and bit error rate (BER).

The next processing step (see block 50 of FIG. 2) is the calculation of the received signal carrier-to-noise ratio (CNR) and probability of error, or bit error rate (BER). The CNR is determined using the method of symbol cluster size analysis, wherein the CNR is determined as a function of the constellation closure $\sigma_n/d$, where $\sigma_n$ is the RMS noise voltage (equal to the RMS symbol cluster size) and d is the noise margin, i.e., the minimum (perpendicular) distance, in volts, from the ideal symbol point to the nearest decision boundary. The quantity $\sigma_n^2$ is called the cluster variance. This method is usable for high enough CNRs that each symbol cluster is entirely within its decision cell. A flow chart for the procedure is shown in FIG. 4. First at step 402, the RMS cluster size $\sigma_n$ is calculated using the following equations:

$$N = \sum_{m=1}^{M} N_m,$$

$$\text{var } x = \frac{1}{N - M} \sum_{m=1}^{M} (N_m - 1) s_{x,m}^2,$$

$$\text{var } y = \frac{1}{N - M} \sum_{m=1}^{M} (N_m - 1) s_{y,m}^2,$$

$$\sigma_n = \sqrt{\frac{\text{var } x + \text{var } y}{2}}.$$

Then at step 404 the reciprocal of the constellation closure $d/\sigma_n$ is calculated. The CNR is then obtained at step 406 as $$CNR(\text{dB}) = 20 \log_{10} \sqrt{\frac{L}{2} \cdot \frac{d}{\sigma_n}},$$

where L is given for each constellation modulation in the following table:

TABLE 1

| Modulation | L | a | b |
| --- | --- | --- | --- |
| QPSK | 2 | 2 | 1/2 |
| 16-QAM | 10 | 3 | 3/4 |
| 32-Cross QAM | 20 | 13/4 | 11/13 |
| 64-QAM | 42 | 7/2 | 7/8 |
| 128-Cross QAM | 82 | 29/8 | 53/58 |
| 256 QAM | 170 | 15/4 | 15/16 |
| 9-QPR | 5.3333 | 8/3 | 2/3 |
| 25-QPR | 16 | 16/5 | 4/5 |
| 49-QPR | 32 | 24/7 | 6/7 |
| 81-QPR | 53.3333 | 32/9 | 8/9 |

The symbol error rate (SER) is obtained at step 408 by first calculating the quantity Q:

$$Q = \frac{1}{2} \text{erfc} \left( \frac{1}{\sqrt{2}} \frac{d}{\sigma_n} \right),$$

where erfc denotes the complementary error function. A lookup table for efrc ( ) can be stored in the memory of computer 76 and interpolated for any value of the argument. The SER is then calculated using the following equation with the appropriate coefficients, as listed in the above table:

$SER=aQ(1-bQ$.

As an alternative to using a lookup table for erfc, the function Q(u) can be evaluated by the polynomial approximation $$Q(u) = \frac{1}{\sqrt{2\pi}} e^{-u^2/2}(c_1 t + c_2 t^2 + c_3 t^3 + c_4 t^4 + c_5 t^5),$$

where $t = \frac{1}{1 + pu}$, $u = d/\sigma_n$, and $p$ and $c_1, \ldots, c_5$ are constants given by $p = 0.2316419$ $c_1 = 0.319381530$ $c_2 = -0.356563782$ $c_3 = 1.781477937$ $c_4 = -1.821255978$ $c_5 = 1.330274429$ The inherent accuracy of this approximation is better than 1% down to an error probability of $10^{-15}$, and 10% down to $10^{-148}$.

Next, the BER is calculated at step 410. For full response QAM and cross-QAM constellations having M symbol cells, the BER is related to the SER by $BER=SER$/bits per symbol, where bits per symbol=$\log_2 M$.

To use the constellation closure to determine CNR, and from it the SER and BER, it is necessary first to be able to resolve the individual symbol clusters, and second, to be able to determine the cluster variance with reasonable accuracy. It is not possible to resolve the individual clusters when the RMS cluster size $\sigma_n$ is close to the noise margin d, that is when $\sigma_n/d \cong 1$. In practice, it is not possible to resolve the individual symbol clusters when $\sigma_n/d > K$, where K is some number in the range 0.5<K<1.0. When $\sigma_n/d = K$, then $(CNR)_{dB}=10 \log_{10}(L/2K^2)$.

This gives the limiting minimum value of CNR below which it is not possible to meaningfully determine the CNR for L corresponding to a particular constellation size and for an assumed value of K. These limiting values of CNR are listed in the following table 2:

TABLE 2

| Modulation | L | CNR(dB) K = 0.25 | K = 0.5 | K = 0.75 | K = 1.0 |
|---|---|---|---|---|---|
| QPSK | 2 | 12.0 | 6.0 | 2.5 | 0.0 |
| 16-QAM | 10 | 19.0 | 13.0 | 9.5 | 7.0 |
| 32-Cross QAM | 20 | 22.0 | 16.0 | 12.5 | 10.0 |
| 64-QAM | 42 | 25.2 | 19.2 | 15.7 | 13.2 |
| 128-Cross QAM | 82 | 28.2 | 22.1 | 18.6 | 16.1 |
| 256QAM | 170 | 31.3 | 25.3 | 21.8 | 19.3 |
| 9-QPR | 5.3333 | 16.3 | 10.7 | 6.8 | 4.3 |

TABLE 2-continued

| Modulation | L | CNR(dB) K = 0.25 | K = 0.5 | K = 0.75 | K = 1.0 |
|---|---|---|---|---|---|
| 25-QPR | 16 | 21.0 | 15.0 | 11.5 | 9.0 |
| 49-QPR | 32 | 24.0 | 18.0 | 14.5 | 12.0 |
| 81-QPR | 53.3333 | 26.3 | 20.3 | 16.8 | 14.3 |

To achieve reasonable accuracy in determining the CNR from cluster variance analysis, a large enough sample symbol set must be used to reduce the expected uncertainty, or standard deviation, of the calculated CNR to a reasonably small value. Specifying or measuring the CNR to an accuracy of much less than 0.1 dB is generally not meaningful. Therefore, a large enough sample set must be used to assure that the uncertainty in the calculated CNR is no larger than 0.1 dB. Some Monte Carlo simulations have been done with data sets of various sizes to estimate the standard deviation of the calculated CNR for various size constellations for a CNR that is theoretically adequate to achieve a BER of $1 \times 10^{-7}$ (the maximum allowed error rate for a VSDL modem).

Figure 5:
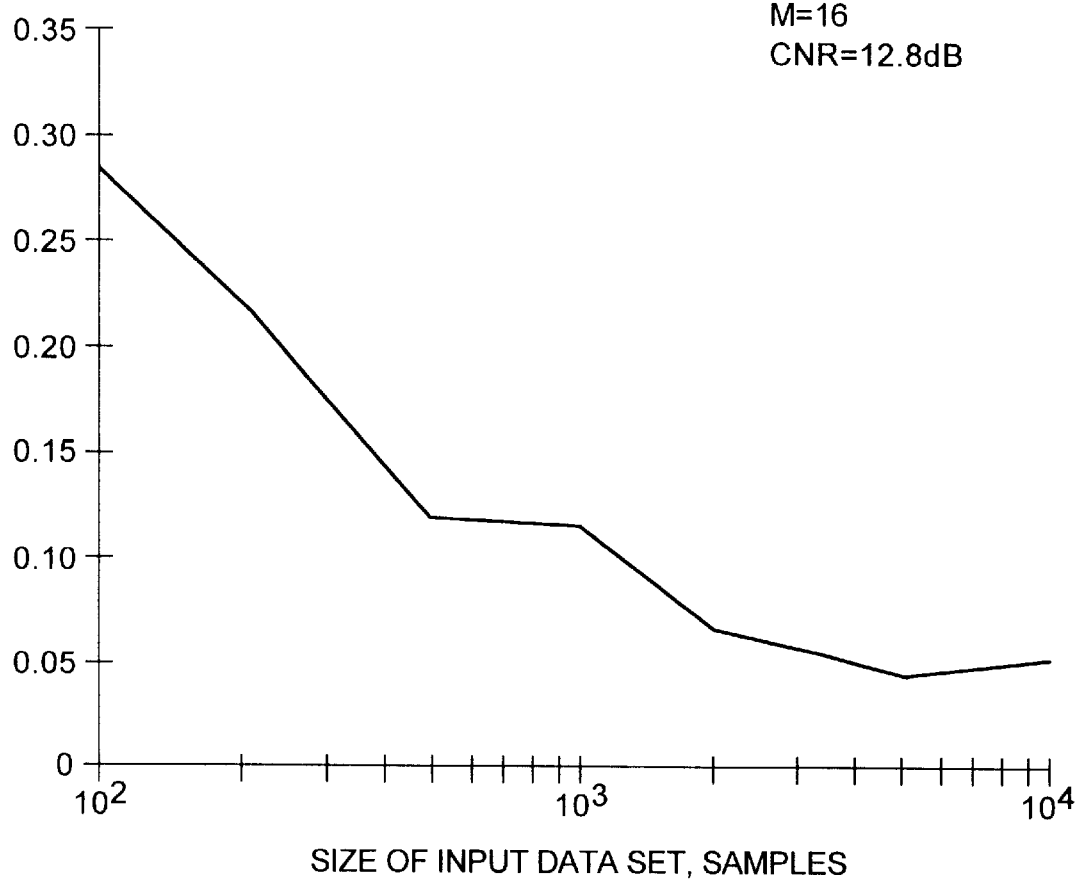
FIG. 5 is a graph of the standard deviation of determined CNR versus size of the input data set for a 16-QAM signal with a CNR of 12.8 dB.
Figure 6:
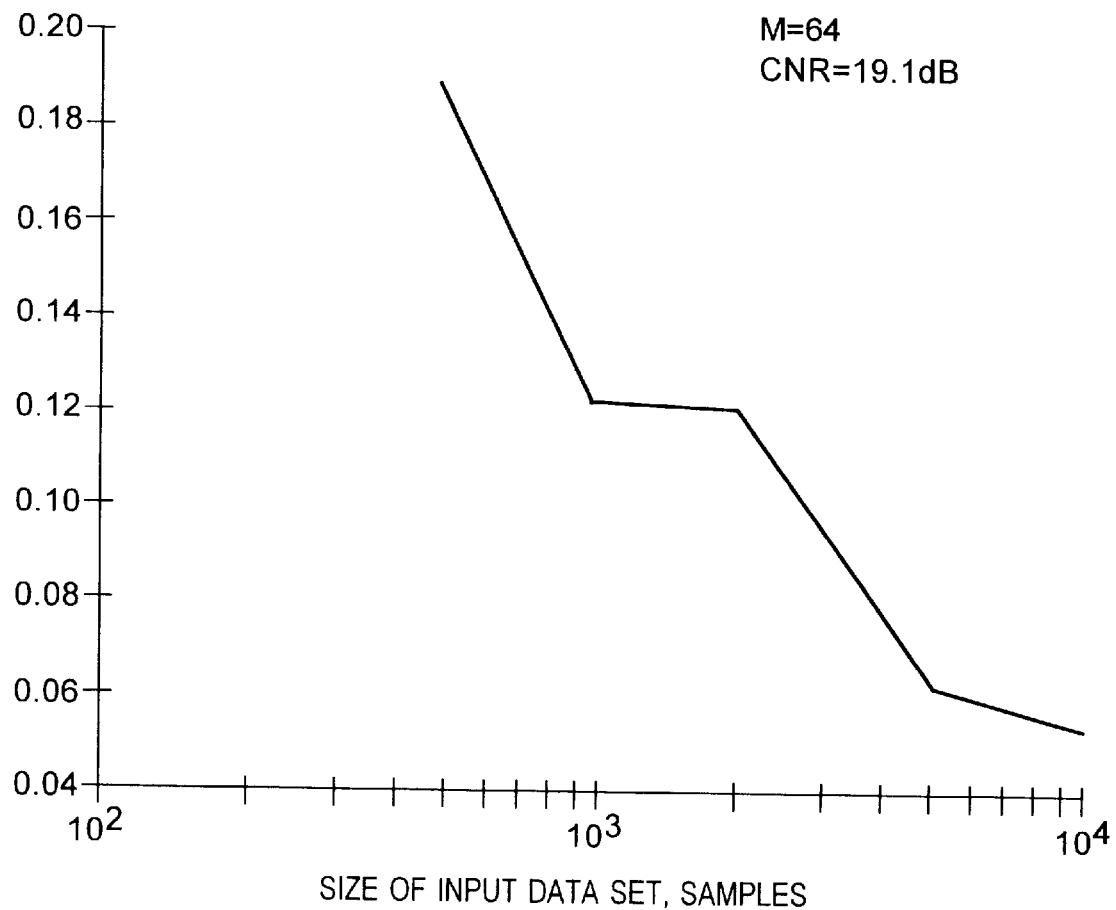
FIG. 6 is a graph of the standard deviation of determined CNR versus size of the input data set for a 64-QAM signal with CNR of 19.1 dB.

FIG. 5 shows the standard deviation of calculated CNR versus size of the input data set for a 16-QAM signal with a CNR of 12.8 dB (needed to achieve a BER of $1 \times 10^{-7}$), and FIG. 6 shows the standard deviation of calculated CNR versus size of the input data set for a 64-QAM signal with a CNR of 19.1 dB (needed to achieve a BER of $1 \times 10^{-7}$). In each case, the standard deviation was calculated using a set of ten simulations at each input data set size, which accounts for the still jagged nature of each graph. FIG. 5 shows that for 16-QAM at least 1500 symbol samples are needed, and for 64-QAM at least 3000 symbol samples are needed to achieve a standard deviation of 0.1 dB in CNR at the critical CNR level. A similar analysis was done for 256-QAM, which needs a CNR of 25.15 dB to achieve a BER of $1 \times 10^{-7}$; it was found that 50,000 samples were needed to achieve a standard deviation of 0.4 dB in the calculated CNR, and it is estimated that 0.2–0.3 million samples would be needed to achieve a BER of $1 \times 10^{-7}$. Consequently, there will be a longer time needed between updates of the estimates of CNR and BER for 256-QAM than for smaller constellations.

For the step of testing the BER (52 in FIG. 2), the BER that is calculated using the above described procedure is compared to the maximum allowed threshold BER. If the calculated BER is at or below the threshold, no change is made to the signal transmission parameters, and a new set of data is accumulated to update the estimated BER and repeat the test. If the calculated BER is above threshold, this suggests that there may be an interference source that is raising the error rate. To check this, the computer 76 goes to the step of calculating the average cluster skewness and/or kurtosis 54, rather than updating the estimated BER. It must be noted that the sample data in either RAM block of the data storage buffer 72 must not be overwritten with new data until the testing of the BER 52 is completed, since the data stored in that RAM block will be needed in the subsequent calculation of skewness and/or kurtosis 54 if the BER test 52 indicates that the BER has risen to an unacceptably high value. To assure this, whenever the BER test 52 registers above threshold, the computer 76 sends a signal informing of this condition to the receiver controller 62. The receiver controller 62 then opens both poles of switch 64 to prevent new data from entering into data storage buffer 72.

When there is no interference present, the x and y components of samples in cluster m are each Gaussian distributed due to noise. If there are no distortions, x and y correspond to the I and Q components. Furthermore, if there is no gain mismatch, the x and y distributions will have the same variance. In that case, the radial distance to the samples from the center of the cluster will have a Rayleigh distribution.

Figure 1B:
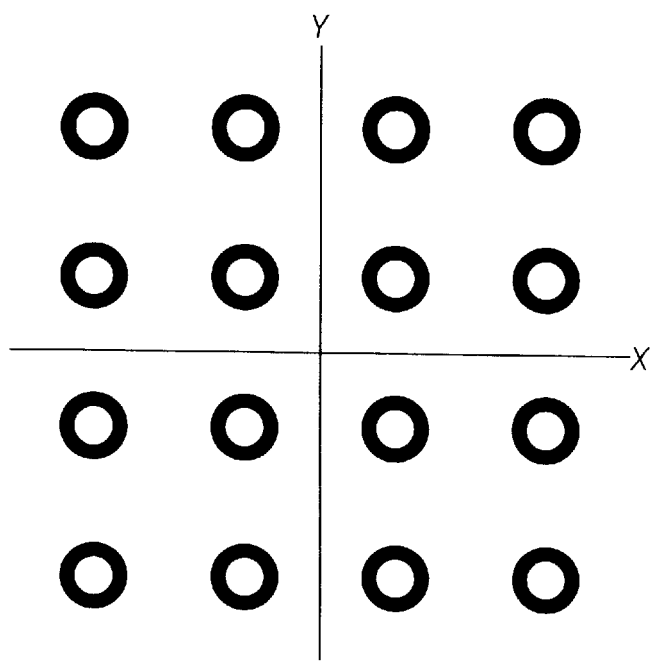

When there is an interferer present (assumed to be a sinusoidal tone at other than the digital carrier frequency), the sinusoidal interferer causes each cluster to be ring shaped due to the addition of a randomly rotated interference vector of constant magnitude to each sample, as shown in FIG. 1. If there were no noise on the system, the interferer would transform each ideal constellation point to a sharp circle of zero thickness. On the other hand, if the interferer had finite amplitude modulation, the locus of the interference vector would have a finite thickness. This thickness would add to the width of the noisy, but interference-free cluster to result in an interference-plus-noisy-symbol cluster ring thicker than the ring that would result from a pure tonal interferer.

When an interferer is present, the radial distance to the samples from the center of the cluster will have a Rice distribution. Thus, to automatically determine whether or not an interferer is present and affecting the digital modem performance, it is necessary to automatically distinguish between a Rayleigh and a Rice distribution, with the same peak radial distance on the Rice distributions for all symbol clusters. For the Rayleigh distribution, the probability density function is given by $$P_{Rayleigh}(r) = r/\sigma^2 e^{-r^2/2\sigma^2}, \; r \geq 0, \quad (1)$$

where $$r = \sqrt{(x_{mk} - \bar{x}_m)^2 + (y_{mk} - \bar{y}_m)^2} \quad (2)$$

is the radial distance from the centroid $(\bar{x}_m, \bar{y}_m)$ of cluster m to the k-th sample in the cluster, located at $(x_{mk}, y_{mk})$. Also the standard deviations of the cluster distribution in each coordinate are assumed equal, so that $\sigma = \sigma_{x_m} = \sigma_{y_m}$. Using the same notation, the Rice distribution is given by $$P_{Rice}(r) = \frac{r}{\sigma^2} e^{-(r^2+a^2)/2\sigma^2} I_0\left(\frac{ra}{\sigma^2}\right), \; r \geq 0, \quad (3)$$

where $I_0(x)$ is the zero-th order modified Bessel function of the first kind, and a the amplitude of the interfering signal. Here, a is the amplitude of the interferer. Note that when $a=0$, $I_0(0)=1$, so that $P_{Rice}(r)=P_{Rayleigh}(r)$.

To decide which type of distribution is present, and thus whether or not an interferer is present, various moments and functions of moments may be calculated for the sample distribution for each cluster, and these moment functions may be compared with the theoretical values for the Rayleigh and Rice distributions. This will work as long as the constellation distortion is not severe, so that the Rayleigh and Rice distributions are approximately valid for their appropriate situations.

The n-th moment of a probability distribution px(x), in the random variable X, is here denoted $$\mu'_n = E[X^n], \quad (4)$$

where $E[\cdot]$ denotes the expected value. $\mu'_1$ is the mean value of X. The n-th central moment is denoted $$\mu_n = E[(X-\mu'_1)^n]. \quad (5)$$

$\mu_2$ is the variance of the distribution. One measure that is useful for characterizing probability distributions is the ratio of the mean to the standard deviation, $$\rho_1 = \mu'_1/\sqrt{\mu_2}. \quad (6)$$

Two other useful measures are the skewness, $$\rho_3 = \mu_3/(\mu_2)^{3/2}, \quad (7)$$

and the kurtosis, $$\rho_4 = \mu_4/\mu_2^2 \quad (8)$$

(see N. L. Johnson and S. Kotz, *Distributions in Statistics, Vol. 1, Discrete Distributions*, Houghton Mifflin Company, 1969, p. 18). The skewness is a measure of the asymmetry of the distribution. Positive values of $\rho_3$ indicate that the distribution is "skewed to the right" so that the right tail is in a certain sense heavier than the left. Similarly, negative values indicate that the left tail is heavier than the right. Kurtosis is a measure of the peakedness of the distribution. For a normal or Gaussian distribution, $\rho_4=3$. For $\rho_4<3$, the distribution is less peaked than a Gaussian; for $\rho_4>3$, it is more peaked.

Equations (6) to (8) are expressed in terms of central moments, except for $\mu'_1$ since there is no $\mu_1$. Note that the shape factors $\rho_1$, $\rho_3$, and $\rho_4$ can all be expressed in the form $\rho_n = \mu_n (\mu_2)^{n/2}$. However, $\rho_2$ is meaningless since $\rho_2=1$. The central moments can be expressed in terms of the moments (4) by $$\left. \begin{aligned} \mu_2 &= \mu'_2 - \mu'^2_1 \\ \mu_3 &= \mu'_3 - 3\mu'_2\mu'_1 + 2\mu'^3_1 \\ \mu_4 &= \mu'_4 - 4\mu'_3\mu'_1 + 6\mu'_2\mu'^2_1 - 3\mu'^4_1 \end{aligned} \right\}. \quad (9)$$

For a Rayleigh distribution, as in (1), the moments (4) are given by $$\mu'_n = (2\sigma^2)^{n/2} \Gamma\left(1 + \frac{n}{2}\right), \quad (10)$$

where $\Gamma(k)$ is the Gamma function, with properties for $k>0$, $$\Gamma(k+1) = \begin{cases} k\Gamma(k) & \text{in general} \\ k! & \text{integers} \end{cases} \quad (11a)$$

$$\Gamma\left(\frac{1}{2}\right) = \sqrt{\pi}, \quad \Gamma\left(\frac{3}{2}\right) = \frac{\sqrt{\pi}}{2}. \quad (11b)$$

Inserting Equations (11) into (10) gives $$\mu'_1 = \sqrt{\frac{\pi}{2}} \sigma, \quad (12a)$$

$$\mu'_2 = 2\sigma^2, \quad (12b)$$

$$\mu'_3 = 3\sqrt{\frac{\pi}{2}} \sigma^3, \quad (12c)$$

$$\mu'_4 = 8\sigma^4. \quad (12d)$$

Then, inserting Equations (9) and (12) into Equations (6) to (8) and simplifying gives the shape factors for the Rayleigh distribution as $$\rho_{1_{Rayleigh}} = \sqrt{\frac{\pi}{4-\pi}} = 1.9131, \tag{13a}$$

$$\rho_{3_{Rayleigh}} = \frac{2\sqrt{\pi}\,(\pi-3)}{(4-\pi)^{3/2}} = 0.6311, \tag{13b}$$

$$\rho_{4_{Rayleigh}} = \frac{32-3\pi^2}{(4-\pi)^2} = 3.2451. \tag{13c}$$

For the Rice distribution in Equation (3), which is equivalent to a noncentral chi-square distribution with two degrees of freedom, the moments (4) are given by $$\mu'_n = (2\sigma^2)^{n/2} e^{-a^2/2\sigma^2}\, \Gamma\!\left(\frac{n}{2}+1\right) {}_1F_1\!\left(\frac{n}{2}+1;\,1;\,\frac{a^2}{2\sigma^2}\right), \tag{14}$$

where ${}_1F_1(\alpha,\beta;x)$ is the confluent hypergeometric function, defined as $${}_1F_1(\alpha;\beta;x) = \sum_{k=0}^{\infty} \frac{\Gamma(\alpha+k)\Gamma(\beta)x^k}{\Gamma(\alpha)\Gamma(\beta+k)k!} \quad \beta \neq 0,-1,-2,\ldots.$$

Comparison of Equations (10) and (14) shows that the moments of the Rice distribution are related to those of the Rayleigh distribution by $$\mu'_{n_{Rice}} = \mu'_{n_{Rayleigh}} e^{-a^2/2\sigma^2}\, {}_1F_1\!\left(\frac{n}{2}+1;\,1;\,\frac{a^2}{2\sigma^2}\right). \tag{15}$$

Furthermore, defining $$z = \frac{a^2}{2\sigma^2}, \tag{16}$$

we have that as $z\to 0$, $e^{-z}\to 1$ and ${}_1F_1(\alpha;1;Z)\to 1$ for arbitrary $\alpha$, so that $\mu'_{n_{Rice}} \to \mu'_{n_{Rayleigh}}$, and Equation (14) reduces to Equation (10). Note that z is the interference-to-noise ratio (INR).

Using published transformations of the confluent hypergeometric function, the moments of the Rice distribution may be expressed as $$\mu'_{1_{Rice}} = \sqrt{\frac{\pi}{2}}\, e^{-z}\!\left[{}_1F_1(-0.5;1;z) + 2z\,{}_1F_1(0.5;1;z)\right]\sigma \triangleq C_1 z(\sigma), \tag{17a}$$

$$\mu'_{2_{Rice}} = 2(1+z)e^{-z}\,{}_1F_1(1;1;z)\sigma^2 \triangleq C_2(z)\sigma^2, \tag{17b}$$

$$\mu'_{3_{Rice}} = \sqrt{\frac{\pi}{2}}\, e^{-z}[2(2+z)\,{}_1F_1(-0.5;1;z) + (4z^2+8z-1)\,{}_1F_1(0.5;1;z)]\sigma^3 \triangleq C_3(z)\sigma^3, \tag{17c}$$

$$\mu'_{4_{Rice}} = 8e^{-z}\,{}_1F_1(3;1;z)\sigma^4 = 4(z^2+4z+2)\sigma^4 \triangleq C_4(z)\sigma^4, \tag{17d}$$

where ${}_1F_1(-0.5;1;z)$, ${}_1F_1(0;5;1z)$ and ${}_1F_1(1;1;z)$ are all tabulated functions (see M. Abramowitz and I. Stegun, Handbook of Mathematical Functions, Dover Publications, Inc., 1965, pp. 504–534, incorporated by reference herein). Inserting these expressions into Equations (9) gives the central moments for the Rice distribution as $$\mu_2(z) = \{C_2(z)-[C_1(z)]^2\}\sigma^2, \tag{18a}$$

$$\mu_3(z) = \{C_3(z)-3C_2(z)C_1(z)+2[C_1(z)]^3,\}\sigma^3, \tag{18b}$$

$$\mu_4(z) = \{C_4(z)-4C_3(z)C_1(z)+6C_2(z)[C_1(z)]^2-3[C_1(z)]^4\}\sigma^4 \tag{18c}$$

Then, inserting Equations (17a) and (18) into Equations (6) to (8) gives the probability distribution shape factors $\rho_n$. The results are $$\rho_1(z) = \frac{C_1(z)}{\sqrt{C_2(z)-[C_1(z)]^2}}, \tag{19a}$$

$$\rho_3(z) = \frac{C_3(z)-3C_2(z)C_1(z)+2[C_1(z)]^3}{\{C_2(z)-[C_1(z)]^2\}^{3/2}}, \tag{19b}$$

$$\rho_4(z) = \frac{C_4(z)-4C_3(z)C_1(z)+6C_2(z)[C_1(z)]^2-3[C_1(z)]^4}{\{C_2(z)-[C_1(z)]^2\}^2}. \tag{19c}$$

Figure 7:
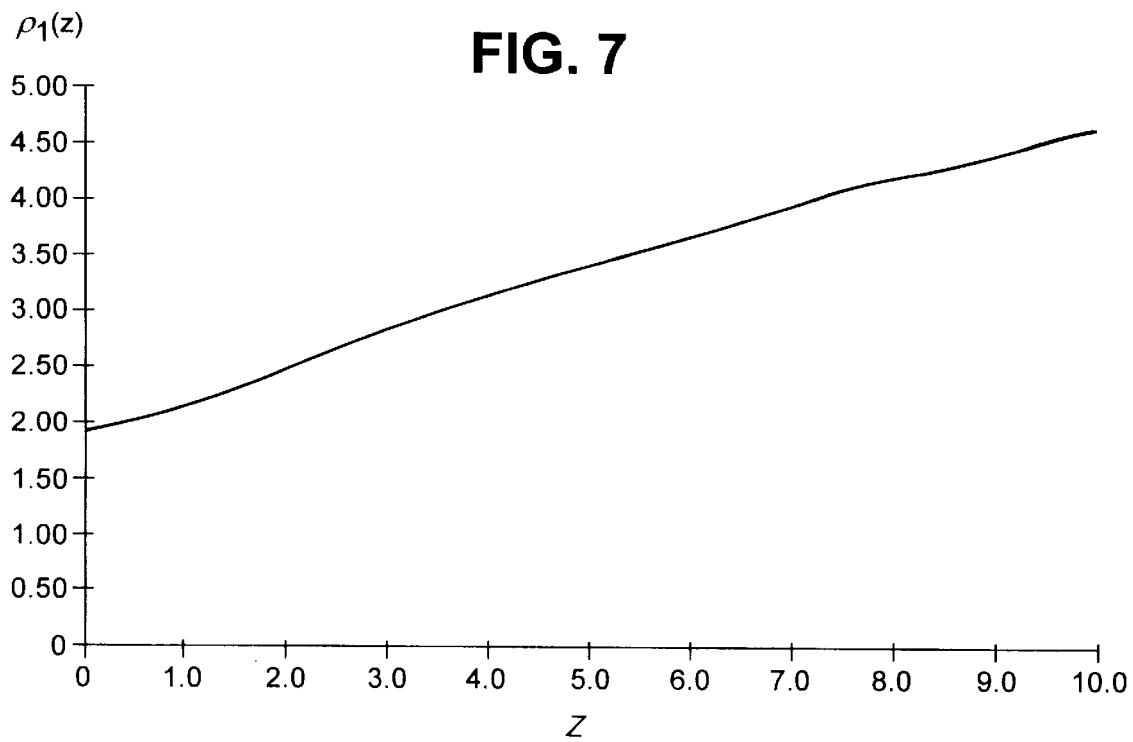
FIG. 7 is a graph of the ratio of the mean to standard deviation, $\rho_1(z)$, versus z for a Rice distribution.
Figure 8:
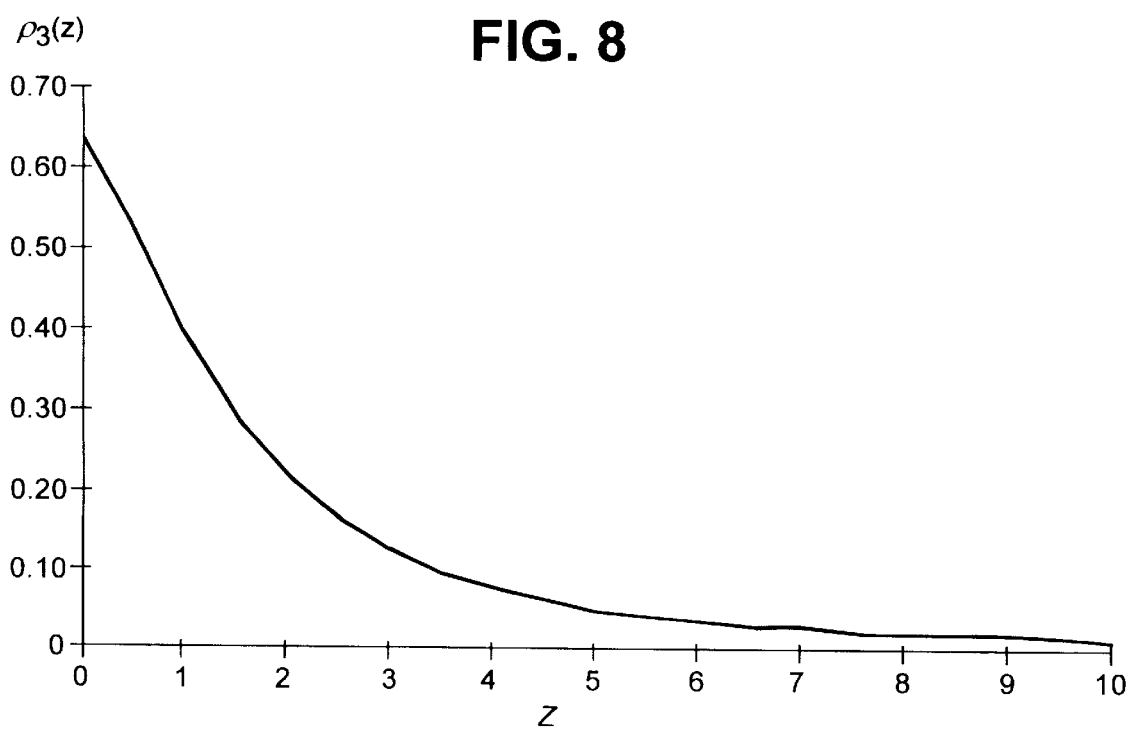
FIG. 8 is a graph of the skewness, $\rho_3(Z)$, versus z for a Rice distribution.
Figure 9:
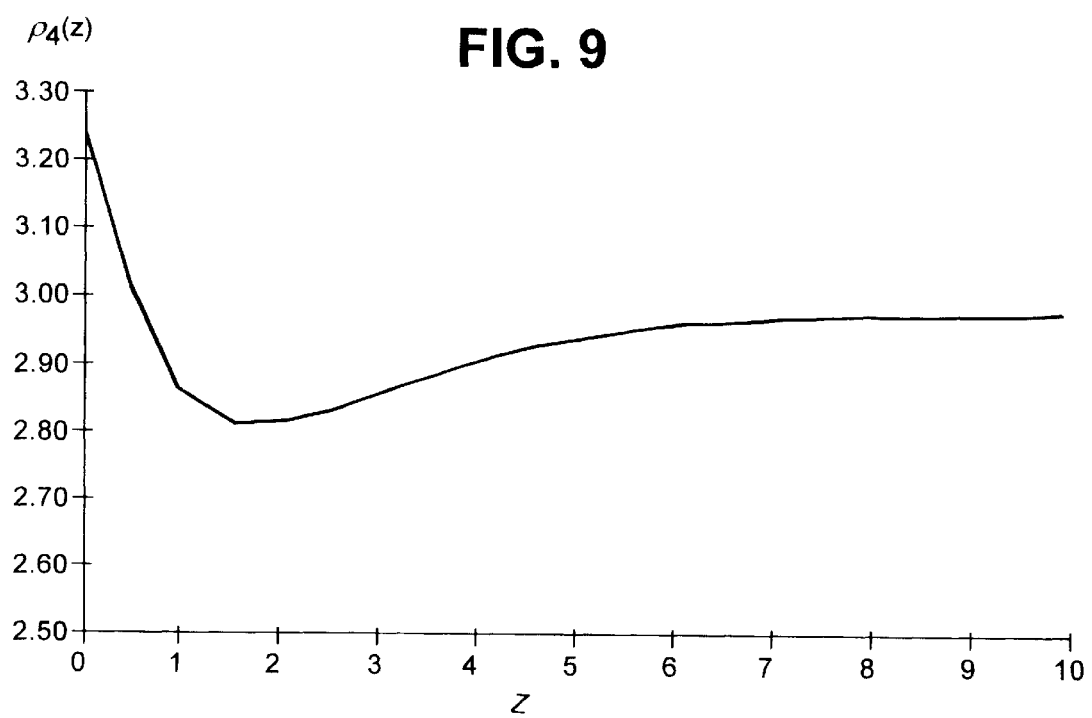
FIG. 9 is a graph of the kurtosis, $\rho_4(Z)$, versus z for a Rice distribution.

Equations (19) are plotted in FIGS. 7 to 9.

The Rice distribution is known to approach the Rayleigh distribution as $z\to 0$, and to approach a Gaussian distribution for large z. Note in FIGS. 7 to 9 that the curves for $\rho_n$ have the values given in Equations (13) for the Rayleigh distribution at z=0. For large values of z, the kurtosis, $\rho_4$, approaches the limiting value of 3, as for a Gaussian distribution. Similarly, the skewness, $\rho_3$, approaches 0, indicating that the distribution is becoming more symmetric, like a Gaussian distribution. For small z, $\rho_3$ is large, indicating that the distribution is highly asymmetric.

It appears from FIGS. 7 to 9 that a reasonable test as to whether a CW interferer is present in the data, and corrupting the constellation, is to calculate the ratios $\bar{\rho}_1$, $\bar{\rho}_3$, and $\bar{\rho}_4$, for the observed data averaged over all symbol clusters, and compare the values with FIGS. 7 to 9. If $\bar{\rho}_1>2.10$, $\bar{\rho}_3<0.50$, and $\bar{\rho}_4<3.10$, one can be reasonably certain that the radial probability distribution of points in the clusters is not Rayleigh, and that there is probably an interferer present. Based upon the curves in these figures, if a single parameter were to be used to make this decision, it should be the skewness, $\bar{\rho}_3$, which exhibits a rapid and monotonic departure from the Rayleigh value at z=0. However, the kurtosis, $\bar{\rho}_4$, also exibits a useful distinction between large values for small z (small or no interferers) and smaller values for large z (large interferers), although the kurtosis function is not monotonic.

To check the validity of this approach, a number of simulations were run for a range of input CNRs and a range of interferer amplitudes, where the amplitude a was normalized to the noise margin d, and the normalized interferer amplitude was varied over the range $0.000001 \leq a/d \leq 0.5$. Although most runs were done with an amplitude spread of 0 on the interferer (no amplitude modulation), some runs were also done with a uniformly distributed amplitude spread of 0.1 to represent a modest amplitude distribution. Similar results were obtained with and without the amplitude modulation. The results of these simulations showed a strong correlation between the cluster skewness $\bar{\rho}_3$ and the calculated carrier-to-interference ratio (CIR), and a somewhat weaker correlation between the cluster kurtosis $\bar{\rho}_4$ and the CIR. The distribution shape parameter $\bar{\rho}_1$ showed a much poorer correlation with the CIR. This prediction that the cluster skewness is the best single predictor of the presence of an interferer was subsequently confirmed by tests on a developmental VDSL modem that had the capability to make the various measurements and tests. Consequently, although both the skewness and kurtosis are shown in Step 54 of the procedure in FIG. 2, the skewness is the preferred parameter if just one is to be calculated.

To calculate the skewness in Step 54, the symbol coordinates for each sample symbol in each cell m are adjusted by subtracting the sample mean coordinates $\bar{x}_m$ and $\bar{y}_m$ to form the coordinate differences from the cluster center, $x_{mk}-\bar{x}_m$ and $y_{mk}-\bar{y}_m$. Then the radial distance of each sample from its cluster center, $$r_{mk} = \sqrt{(x_{mk} - \bar{x}_m)^2 + (y_{mk} - \bar{y}_m)^2}, \qquad (20)$$

is calculated. If there is no distortion of the constellation, so that the expected values of the sample mean coordinates $\bar{x}_m$ and $\bar{y}_m$ coincide with the ideal locations of the cluster centers, then the sample means in Equation 20 may be replaced by the ideal cluster coordinates. This also eliminates statistical fluctuations in the calculated cluster mean coordinates.

Next, within Step 54, the sample moments $$s'_n = \frac{1}{MN} \sum_{m=1}^{M} \sum_{k=1}^{N_m} r_{mk}^n, \quad n = 1, \ldots, 4,$$

are calculated, where $N_m$ is the number of data symbol samples in the bin for symbol cell m, accumulated previously in Step 48, and N is the total number of data symbol samples in all bins. Analogous to Equations (9), the second and third central moments are then calculated by $$s_2 = s'_2 - s'^2_1,$$

$$s_3 = s'_3 - 3s'_2 s'_1 + 2s'^3_1$$

The cluster skewness is then calculated by $$\bar{\rho}_3 = s_3/(s_2^{3/2}).$$

Similarly, to calculate the kurtosis in Step 54, the fourth central moment is calculated by $$s_4 = s'_4 - 4s'_3 s'_1 + 6s'_2 s'^2_1 - 3s'^4_1,$$

and the cluster kurtosis is then calculated by $$\bar{\rho}_4 = s_4/s_2^2.$$

Figure 10:
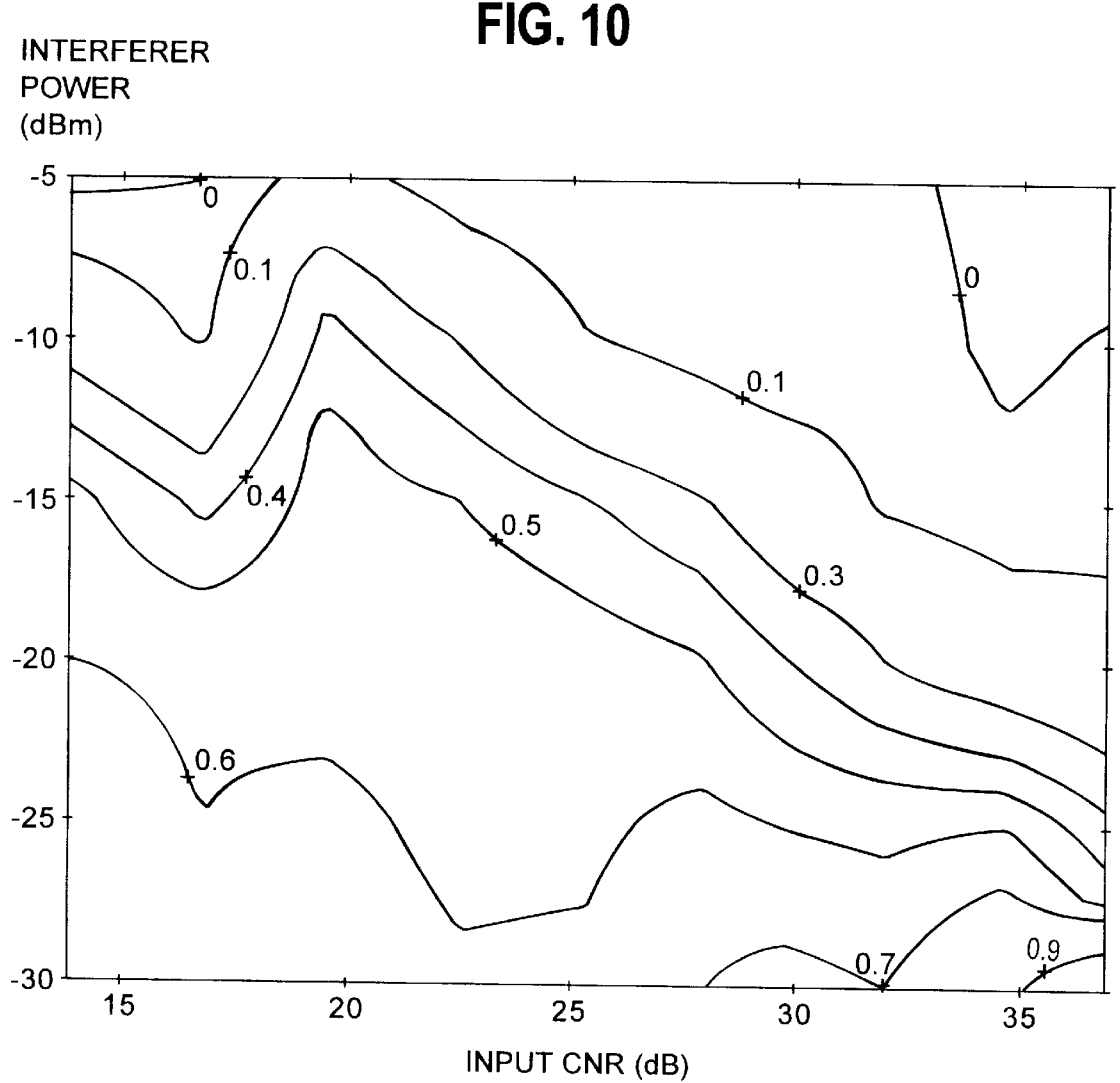
FIG. 10 is a graph depicting cluster skewness as a function of CNR and interferer amplitude versus inteferer power.
Figure 11:
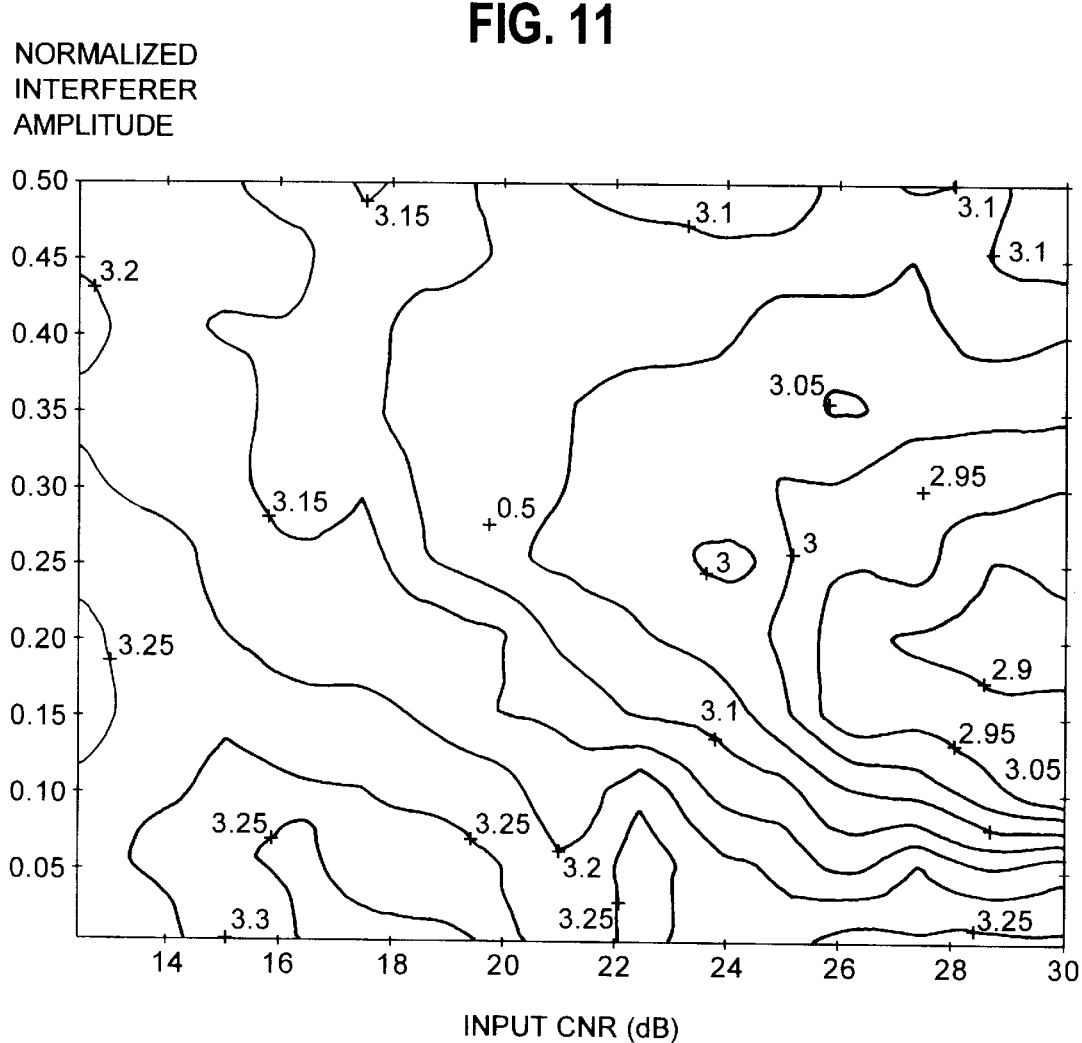
FIG. 11 is a graph depicting cluster kurtosis as a function of CNR and interferer amplitude versus normalized interferer amplitude.

To determine whether an interferer is present, the calculated skewness and/or kurtosis is compared, in Step 56, with a threshold level determined from FIG. 8 or 9, respectively. As seen from FIG. 8, a skewness less than about 0.50 indicates that the cluster radial distribution is Ricean distributed, indicating that an interferer is present, while a skewness greater than this value indicates a Rayleigh distribution, indicating that no interferer is present. Similarly, from FIG. 9 it is seen that a kurtosis less than about 3.15 indicates that the cluster radial distribution is Ricean distributed, indicating that an interferer is present, while a kurtosis greater than this value indicates a Rayleigh distribution, indicating that no interferer is present. In experiments on the developmental VDSL modem, a skewness threshold of 0.3 to 0.5 and a kurtosis threshold of 3.12 to 3.15 have been found to be optimum. However, the lower the CNR of the input signal, i.e., the higher the noise level, the stronger the interferer must generally be to detect it above the noise. Of course, the smaller the interference-to-noise ratio (INR) is, the less proportionate effect the interferer has on the overall SER. When the cluster skewness is plotted as a function of both the CNR and the normalized interferer amplitude, as in FIG. 10 (which was generated for a 4-QAM signal), it is found that, except for some anomalous behavior in the vicinity of CNRs from 15 to 20 dB (which is reproducible, but of undetermined cause), a given skewness threshold level can only detect larger amplitude interferers as the CNR decreases. Similarly jagged and anomalous results have been found when using the cluster kurtosis as the interference detection measure, as shown in FIG. 11. With either approach, neither the skewness nor the kurtosis can be used to determine the interferer's amplitude. But either can be used to determine whether an interferer with amplitude significantly (more so for kurtosis than for skewness) higher than that corresponding to that of the test criterion is present (except at low input CNRs and high interferer amplitudes where the contours of skewness or kurtosis versus CNR are essentially vertical). Within these limits, for any CNR, a skewness and/or kurtosis threshold can be selected to determine whether an interferer with amplitude greater than a specified level is present. For high noise and strong interferers, the combined effect is to expand the size of the symbol clusters so much that they overlap, at which point determination of CNR, SER, and cluster skewness and kurtosis from constellation analysis is no longer possible. Also, when there is much noise (low CNR), the resulting statistical fluctuations cause some uncertainty in the calculated skewness and kurtosis, reducing the significance of the threshold decision. Nevertheless, at moderate and high CNRs, the method works quite well, and has been found valuable in detecting weak interferers.

Note from FIG. 7 that the quantity $\bar{\rho}_1 = s'_1/\sqrt{s_2}$ has a unique value for any value of the quantity z given in Equation (16), which is the INR. Therefore, if it has been concluded that an interferer is present, the value of $\bar{\rho}_1$ may be calculated, and the corresponding value of z may be looked up in a tabulated version of FIG. 7 to obtain an estimate of the INR for diagnostic purposes.

When the skewness and/or kurtosis test 56 has found the presence of an interferer, the computer 76 sends a notification message via reverse control channel 58 to transmitter controller 60. Transmitter controller 60 then interrupts the input bit stream 20 and turns off the power amplifier 28, so that the only input to the receiver 18 is the external interference 32. Meanwhile, the computer 76 also sends a notification message to receiver controller 62, which sets the carrier frequency and symbol rate synchronizers to flywheel, opens both poles of switch 64, and closes switch 70, so that the received external interference 32 goes (through an amplifier, not shown) to the analog-to-digital conversion 78 and spectrum analysis 74. The receiver controller 62 also sends an acknowledgment to the transmitter controller 60 that the receiver 18 is temporarily ceasing to process received digital data while the computer is performing the spectrum analysis. The transmitter controller 60 does not turn off the transmitter 16 until this acknowledgment is received. Simultaneously, the computer 76 switches its operation entirely over to spectrum analysis 74. The results of the spectrum analysis are sent via reverse control channel 58 to transmitter controller 60 which analyzes the received spectrum to find a carrier frequency at which the desired data rate may be transferred without encountering any interference. If no pass band of sufficient width is available, the transmitter controller 60 will switch transmission to a higher order constellation with a lower symbol rate, providing that such a combination is available that can provide the desired bit rate, and provided that the noise margin in the new constellation is adequate to provide the required BER. If these conditions cannot be met, the transmitter controller 60 will attempt to reduce the transmitted bit rate with the same or larger constellation in order to reduce the transmitted bandwidth, providing that the information to be transmitted will not be impaired by a reduced bit rate, as would some types of real-time transmissions.

After selecting a new carrier frequency, constellation size, and/or symbol rate, the transmitter controller 60 inserts a control message into the input bit stream 20 to transmit over the forward transmission channel 30 to the receiver 18. The receiver controller 62 extracts this message out of the output bit stream 46 and then sets the receiver 18 to receive and demodulate a signal with these new parameters. The receiver controller 62 also sends an acknowledgment of the receipt of this control message over the reverse control channel 58 to the transmitter controller 60. Only after receiving this acknowledgment does the transmitter controller 60 actually change the transmitter parameters to the new values.

At this point, receiver controller 62 also opens switch 70, closes both poles of switch 64, and directs computer 76 to switch back to accumulating statistics on the new received symbol stream: calculating the CNR and BER; testing the BER; and, if necessary; calculating and testing the skewness and/or kurtosis on the new received constellation.

While the invention has been particularly shown and described with reference to preferred embodiments thereof, it will be understood by those skilled in the art that various changes in form and details may be made therein without departing from the spirit and scope of the invention. Changes in future embodiments of the invention can therefore be made without departing from the teachings herein.

What is claimed is:

1. In a communication apparatus, a method of detecting whether an interference signal is being received with a received signal of interest (SOI), said method being nonintrusive to a continued reception of the SOI and comprising steps of:
    (a) accumulating statistical information associated with said SOI;
    (b) determining whether an intrusive interference signal is present with said SOI, said step further comprising substeps of:
        (i) determining a root mean square (RMS) cluster size of said intrusive interference signal;
        (ii) determining a reciprocal constellation closure of said intrusive interference signal; and
        (iii) determining a carrier-to-noise ratio (CNR) of said intrusive interference signal;
    (c) analyzing, when an intrusive interference signal is present, said intrusive interference signal to determine the frequency thereof;
    (d) identifying a spectral region free of interferers; and
    (e) adjusting said communication apparatus to operate in said spectral region identified in step (d).

2. The method of claim 1 wherein said step (b) further comprises determining a symbol error rate of said intrusive interference signal.

3. The method of claim 1 wherein said step (b) further comprises determining a bit error rate of said intrusive interference signal.

4. The method of claim 1 wherein said step (b) further comprises determining an average cluster skewness associated with said intrusive interference signal.

5. The method of claim 1 wherein said step (b) further comprises determining an average cluster kurtosis associated with said intrusive interference signal.

6. A transceiver for transmitting and receiving data signals, said transceiver being capable of non-intrusively detecting an interference signal to said data signals, said transceiver comprising:
    storage means for accumulating statistical information associated with said data signals;
    interference determining means for determining whether an unacceptable interference signal is present with said data signals;
    analysis means for spectrum analyzing said unacceptable interference signal and determining a frequency thereof and further locating a spectral region free of interferers;
    conveyance means for communicating to a transmitter said spectral region free of interferers; and
    means responsive to said conveyance means for changing operation of the transceiver and transmitter to said spectral region free of interferers.

7. The transceiver of claim 6 wherein said interference signal is a continuous wave signal.

8. The transceiver of claim 7 wherein said transceiver uses quadrature amplitude modulation.

9. The transceiver of claim 7 wherein said transceiver uses carrierless AM/PM data communication methods.

10. The transceiver according to claim 7 wherein said storage means accumulates both presliced quadrature amplitude coordinates and sliced symbol cell identification data.

11. The transceiver according to claim 10 wherein said analysis means processes a sequence of demodulated symbols to calculate the statistics of in-phase and quadrature mean coordinates and in-phase and quadrature sample variances for a subset of symbols in each decision cell from said sequence of demodulated symbols, said sliced data being used to assign said presliced data to a proper symbol cell.

12. The transceiver according to claim 11 wherein said analysis means further determines from said statistics a root mean square (RMS) cluster size for all the symbol clusters in a constellation, a constellation closure, a resulting carrier-to-noise-ratio, a resulting symbol error rate, and a resulting bit error rate (BER).

13. The transceiver according to claim 12 wherein said analysis means further tests the magnitude of said bit error rate to determine whether the quality of said demodulated signal is above an acceptable threshold and if not, then directing the commencement of further processing to determine whether the degradation of the quality of said demodulated signal is due to the presence of said continuous wave interfering signal.

14. The Transceiver according to claim 12 wherein said analysis means determines an average cluster skewness for the symbol clusters in said constellation and tests the magnitude of said skewness to decide whether an interferer is most likely present, which would be the cause of said degradation of said BER.

15. The transceiver according to claim 12 wherein said analysis means determines an average cluster kurtosis for the symbol clusters in said constellation and testing the magnitude of said kurtosis to decide whether an interferer is most likely present, which would be the cause of said degradation of said BER.

16. The transceiver according to claim 14, wherein said conveyance means transmits the results of said test of skewness back to said transmitter over a reverse channel, said transmitter temporarily turning off transmission while said receiver receives only the external interference signals in the RF environment, and spectrum analyzing said environment to determine the frequencies of said interference signals.

17. The transceiver according to claim 15 wherein said conveyance means transmits the results of said test of kurtosis back to said transmitter over a reverse channel, said transmitter temporarily turning off transmission while said receiver receives only the external interference signals in the RF environment, and spectrum analyzing said environment to determine the frequencies of said interference signals.

18. The transceiver according to claim 16 wherein said conveyance means transmits the results of said spectrum analysis back to said transmitter over a reverse channel, said transmitter determining new transmission parameters to avoid said interference signals, and said transmitter transmitting said new transmission parameters to said transceiver.

19. The transceiver according to claim 18 wherein said transceiver and said transmitter reconfigure to transmit and receive the desired data signals with said new transmission parameters and then resuming data transmission using said new transmission parameters.

20. The transceiver according to claim 18 wherein said new transmission parameters include a new carrier frequency, QAM modulation order, and data rate.

21. The transceiver according to claim 7 wherein said transceiver uses quadrature partial response modulation.

22. A modem capable of non-intrusively detecting an unwanted interferer during a receiving of a data signal, comprising:

a transmitter for transmitting information to a communications apparatus;

a receiver for receiving said data signal from said communication apparatus;

a memory coupled to said receiver for storing statistical information associated with said data signal; and a processor for measuring constellation statistics from said statistical information, determining a carrier-to-noise ratio and bit error rate of said data signal, determining whether a continuous wave or narrowband interferer is present, determining whether said bit error rate exceeds an acceptable limit by testing whether a symbol cluster changes from a Rayleigh distribution to a Ricean distribution, and when said bit error rate exceeds said acceptable limit, interrupting said received data signal to spectrum analyze a transmission band for an interference free region of said transmission band and communicating said interference free region to said communications apparatus for adjustment.

23. The modem according to claim 22 wherein said testing comprises calculating a skewness associated with said symbol cluster.

24. The modem according to claim 22 wherein said testing comprises calculating a kurtosis associated with said symbol cluster.

25. The modem according to claim 21 further comprising an analog-to-digital converter coupled for converting said data signal into a digital signal.

26. The modem according to claim 23 further comprising a fast-Fourier-transform-analysis means for spectrum analyzing said analog signal.

* * * * *

UNITED STATES PATENT AND TRADEMARK OFFICE
CERTIFICATE OF CORRECTION

PATENT NO.    : 6,304,594 B1
DATED         : October 16, 2001
INVENTOR(S)   : Sheldon Norman Salinger It is certified that error appears in the above-identified patent and that said Letters Patent is hereby corrected as shown below:

Column 3,
Lines 43 and 45, delete "Z" and insert -- z --

Column 7,
Line 35, delete "Nm" and insert -- $N_m$ --

Column 11,
Line 60, delete "px(x)" and insert -- $p_x(x)$ --

Column 13,
Line 41, delete "μn$_{Rayleigh}$" and insert -- $\mu_{nRayleigh}$ --
Line 59, delete "$C^4(z)\sigma^2$" and insert -- $C^4(z)\sigma^4$ --
Line 61, delete "$_1F_1(0.5;1z)$" and insert -- $_1F_1(0.5;1;z)$ --

Column 15,
Line 35, delete "$\rho_3 = s_3/(s_2^{3/2}$" and insert -- $\rho_3 = s_3/(s_2)^{3/2}$ --

Signed and Sealed this

Twenty-first Day of May, 2002

Attest:

Attesting Officer

JAMES E. ROGAN
Director of the United States Patent and Trademark Office